US012656579B2

(12) United States Patent
Liu

(10) Patent No.: US 12,656,579 B2
(45) Date of Patent: Jun. 16, 2026

(54) IMAGING LENS

(71) Applicant: GUANGZHOU LUXVISIONS INNOVATION TECHNOLOGY LIMITED, Guangzhou (CN)

(72) Inventor: Chuan-Hui Liu, Guangzhou (CN)

(73) Assignee: GUANGZHOU LUXVISIONS INNOVATION TECHNOLOGY LIMITED, Guangzhou (CN)

( * ) Notice: Subject to any disclaimer, the term of this patent is extended or adjusted under 35 U.S.C. 154(b) by 281 days.

(21) Appl. No.: 18/409,799

(22) Filed: Jan. 11, 2024

(65) Prior Publication Data

US 2024/0337818 A1 Oct. 10, 2024

(30) Foreign Application Priority Data

Apr. 6, 2023 (CN) .......................... 202320739104.9

(51) Int. Cl.
*G02B 9/64* (2006.01)
*G02B 13/00* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
USPC ......................................................... 359/708
See application file for complete search history.

(56) References Cited

U.S. PATENT DOCUMENTS

| | | | | |
|---|---|---|---|---|
| 5,073,015 A | * | 12/1991 | Ueda ..................... | G02B 15/177 |
| | | | | 359/680 |
| 5,076,677 A | * | 12/1991 | Sato ..................... | G02B 15/177 |
| | | | | 359/708 |
| 5,243,466 A | * | 9/1993 | Lee ..................... | G02B 15/1421 |
| | | | | 359/692 |
| 5,398,135 A | * | 3/1995 | Ohashi ................. | G02B 15/142 |
| | | | | 359/713 |
| 5,546,232 A | * | 8/1996 | Hirakawa .......... | G02B 15/1425 |
| | | | | 359/691 |
| 5,576,891 A | * | 11/1996 | Ohashi ............... | G02B 15/1421 |
| | | | | 359/713 |
| 5,825,557 A | * | 10/1998 | Ohno ................... | G02B 15/142 |
| | | | | 359/691 |
| 5,864,435 A | * | 1/1999 | Toyama ............... | G02B 15/142 |
| | | | | 359/795 |

(Continued)

FOREIGN PATENT DOCUMENTS

| | | |
|---|---|---|
| CN | 1670603 | 8/2011 |
| CN | 116668568 | 8/2023 |

*Primary Examiner* — William R Alexander
(74) *Attorney, Agent, or Firm* — JCIPRNET

(57) ABSTRACT

An imaging lens sequentially including first to seventh lenses from an object side to an image side along an optical axis is provided. The first lens, the fourth lens, and the sixth lens have positive refracting power, and the second lens and the seventh lens have negative refracting power. There are a total of seven lenses having refracting power in the imaging lens. When the first to seventh lenses are grouped into a first group close to the object side and a second group close to the image side, a plurality of lenses totaling three to five lenses have refracting power in the first group, a plurality of lenses totaling two to four lenses have refracting power in the second group, and the first group is configured to move relative to the second group on the optical axis. Therefore, the imaging lens provided by the invention has favorable imaging quality.

9 Claims, 9 Drawing Sheets

(56)                    References Cited

U.S. PATENT DOCUMENTS

| | | | | |
|---|---|---|---|---|
| 8,908,295 B1 * | 12/2014 | Tsai | ......................... | G02B 9/62 |
| | | | | 359/740 |
| 10,670,837 B2 * | 6/2020 | Kuo | ................... | G02B 13/0045 |
| 11,048,064 B2 * | 6/2021 | Fukaya | .................... | G02B 9/64 |
| 11,460,670 B2 * | 10/2022 | Hsieh | ...................... | G02B 9/64 |
| 11,686,924 B2 * | 6/2023 | Liu | ......................... | G02B 9/64 |
| | | | | 359/708 |
| 12,248,196 B2 * | 3/2025 | Chen | ................. | G02B 13/0045 |
| 2014/0184845 A1 * | 7/2014 | Nakayama | ............ | G02B 13/04 |
| | | | | 359/740 |
| 2016/0202452 A1 * | 7/2016 | Kuo | ................... | G02B 27/0025 |
| | | | | 359/708 |
| 2018/0239117 A1 * | 8/2018 | Lee | ................... | G02B 27/0025 |
| 2018/0246301 A1 * | 8/2018 | Fukaya | ............. | G02B 27/0025 |
| 2019/0025551 A1 * | 1/2019 | Kuo | ................... | G02B 13/0045 |
| 2021/0063695 A1 * | 3/2021 | Hsieh | ...................... | G02B 9/64 |
| 2021/0396963 A1 * | 12/2021 | Liu | ......................... | G02B 9/64 |
| 2023/0072736 A1 * | 3/2023 | Jang | ......................... | G02B 9/10 |
| 2023/0176326 A1 * | 6/2023 | Chen | ......................... | G02B 9/64 |
| | | | | 359/755 |
| 2024/0151941 A1 * | 5/2024 | Chen | ................. | G02B 13/0045 |

* cited by examiner

Distortion
Half field of view angle (°)

41.0

-2.0        0        2
%

Field curvature (in tangential direction)
Half field of view angle (°)

41.0

-0.5        0        0.5
mm

Field curvature (in sagittal direction)
Half field of view angle (°)

41.0

-0.5        0        0.5
mm

--- 650 nm
---- 610 nm
-·-· 555 nm
···· 510 nm
—— 470 nm

IMAGING LENS

CROSS-REFERENCE TO RELATED APPLICATION

This application claims the priority benefit of China application serial no. 202320739104.9, filed on Apr. 6, 2023. The entirety of the above-mentioned patent application is hereby incorporated by reference herein and made a part of this specification.

BACKGROUND

Technical Field

The invention relates to an imaging lens.

Description of Related Art

The specifications of portable electronic devices are changing with each passing day, and the optical imaging lens, one of the key components, is also developing in more diversified ways. For the lenses of the portable electronic devices, the sensor has a trend of getting larger and larger, resulting in the size of the lens becoming larger and larger. Therefore, there is an urgent need to develop an imaging lens that can shorten the total length of the lens.

SUMMARY

The invention provides an imaging lens, the total length of the lens can be reduced.

According to an embodiment of the invention, an imaging lens is provided, which sequentially includes first to seventh lenses from an object side to an image side along an optical axis. The first lens, the fourth lens, and the sixth lens have positive refracting power, and the second lens and the seventh lens have negative refracting power. There are a total of seven lenses having refracting power in the imaging lens. When the first to seventh lenses are grouped into a first group close to the object side and a second group close to the image side, a plurality of lenses totaling three to five lenses have refracting power in the first group, a plurality of lenses totaling two to four lenses have refracting power in the second group, and the first group is configured to move relative to the second group on the optical axis.

According to an embodiment of the invention, the distance in which the first group moves relative to the second group on the optical axis falls within a range of less than or equal to 0.90 mm.

According to an embodiment of the invention, when the distance between the first group and the second group is a minimum value, vertical projections of the lens closest to the image side in the first group and the lens closest to the object side in the second group on the optical axis overlap.

According to an embodiment of the invention, a diameter of the lens closest to the image side in the first group is less than a diameter of the lens closest to the object side in the second group.

According to an embodiment of the invention, the first group has positive refracting power, and the second group has negative refracting power.

According to an embodiment of the invention, a distance TL1 on the optical axis between an object-side surface of the lens closest to the object side and an image-side surface of the lens closest to the image side among the plurality of lenses of the first group satisfies the conditional expression:

$0.35 \times ImgH < TL1 < 0.65 \times ImgH$, where ImgH is half the diagonal length of an effective pixel area on an image plane.

According to an embodiment of the invention, a distance TL2 on the optical axis between an object-side surface of the lens closest to the object side and an image-side surface of the lens closest to the image side among the plurality of lenses of the second group satisfies the conditional expression: $0.40 \times ImgH < TL2 < 0.70 \times ImgH$, where ImgH is half the diagonal length of the effective pixel area on the image plane.

According to an embodiment of the invention, an aperture is further included, which is disposed on the object side of the first lens.

According to an embodiment of the invention, an effective focal length EFL1 of the first group satisfies the conditional expression: $ImgH < EFL1 < 1.40 \times ImgH$, where ImgH is half the diagonal length of the effective pixel area on the image plane.

According to an embodiment of the invention, an effective focal length EFL2 of the second group satisfies the conditional expression: $1.40 \times ImgH < EFL2 < 3.15 \times ImgH$, where ImgH is half the diagonal length of the effective pixel area on the image plane.

Based on the above, each lens of the imaging lens provided by the embodiment of the invention can be grouped into a first group close to the object side and a second group close to the image side. The first group can move relative to the second group to shorten the total length of the lens, and the imaging lens has favorable imaging quality.

In order to make the above-mentioned features and advantages of the invention clearer and easier to understand, the following embodiments are given and described in details with accompanying drawings as follows.

DESCRIPTION OF THE EMBODIMENTS

Figure 1A:
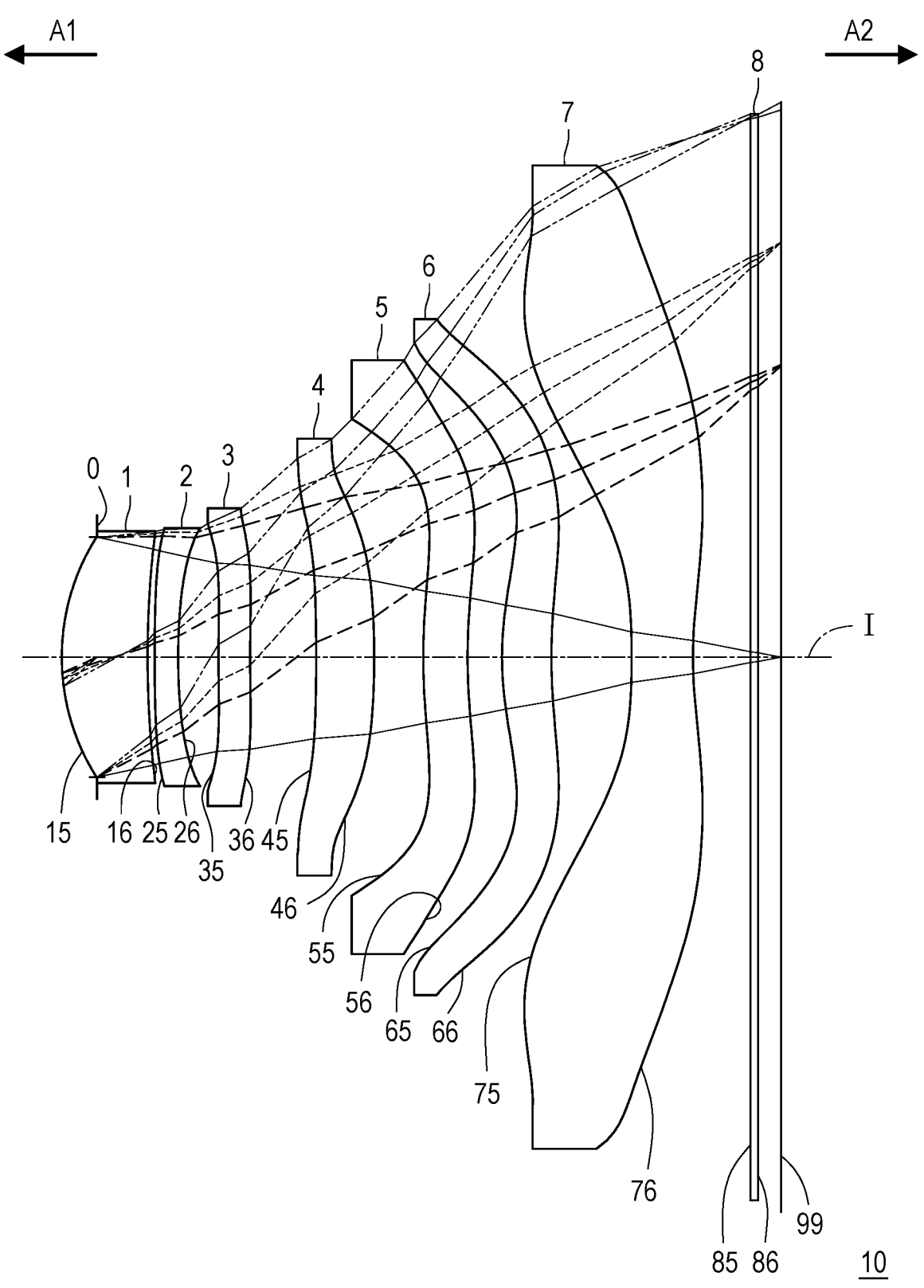
FIG. 1A and FIG. 1B are schematic diagrams of an imaging lens according to a first embodiment of the invention.
Figure 1B:
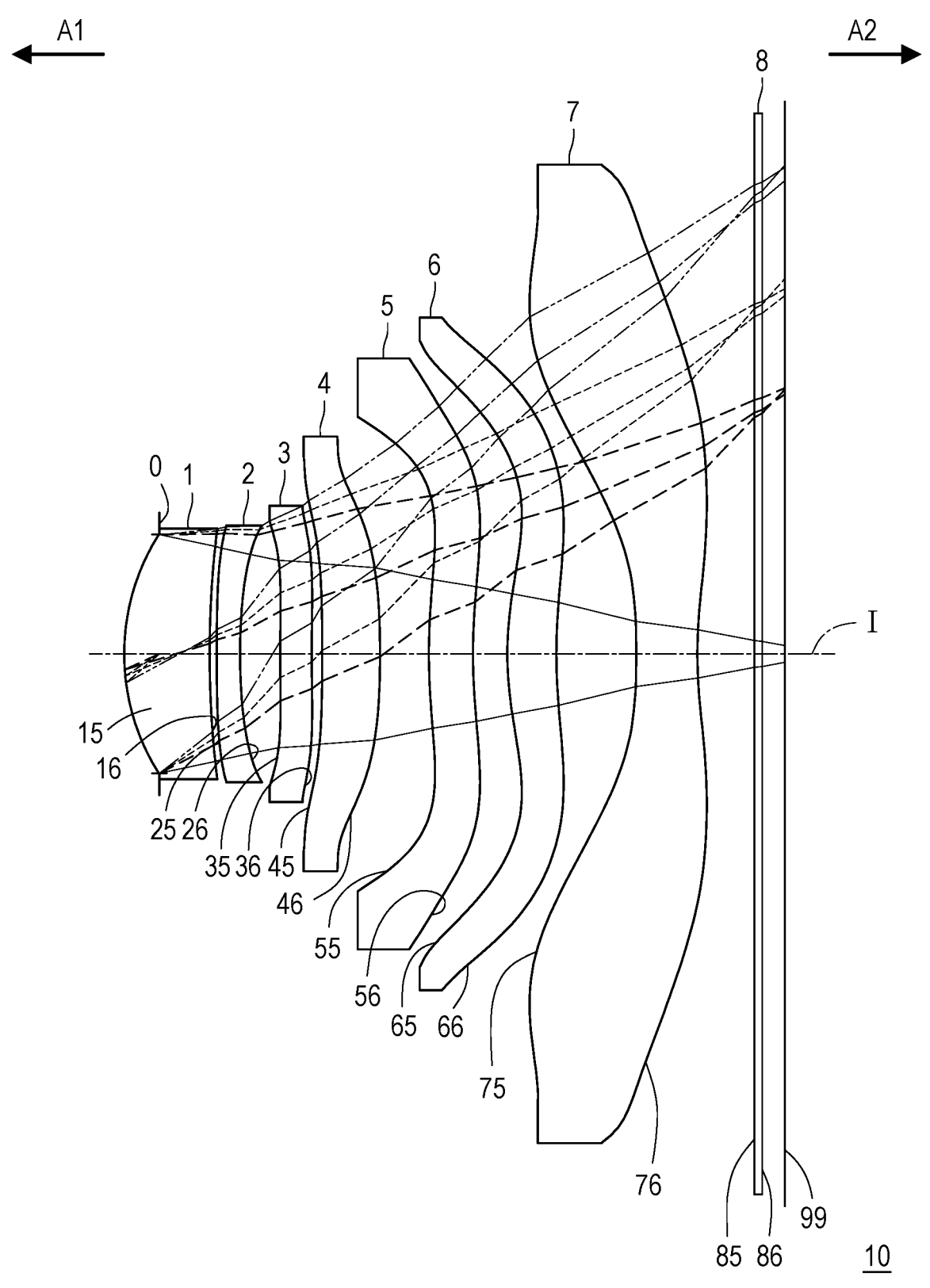

Referring to FIG. 1A and FIG. 1B, a schematic diagram of an imaging lens according to a first embodiment of the invention is shown. An imaging lens 10 sequentially includes an aperture 0, a first lens 1, a second lens 2, a third lens 3, a fourth lens 4, a fifth lens 5, a sixth lens 6, a seventh lens 7, and a filter 8 along an optical axis I of the imaging lens 10 from an object side A1 to an image side A2. When the light emitted by an object to be photographed enters the imaging lens 10 and sequentially passes through the aperture 0, the first lens 1, the second lens 2, the third lens 3, the fourth lens 4, the fifth lens 5, the six lenses 6, the seventh lens 7, and the filter 8, an image will be formed on an image plane 99. Half of the diagonal length of the effective pixel area on the image plane 99 is 8 mm (ImgH is 8 mm). The filter 8 is, for example, an infrared cut-off filter, which can allow light with an appropriate wavelength (such as infrared or visible light) to pass through and filter out the infrared band that is to be filtered. The filter 8 is disposed between the seventh lens 7 and the image plane 99. It should be added that the object side A1 is the side facing the object to be photographed, and the image side A2 is the side facing the image plane 99.

In the embodiment, the first lens 1, the second lens 2, the third lens 3, the fourth lens 4, the fifth lens 5, the sixth lens 6, the seventh lens 7, and the filter 8 of the optical imaging lens 10 respectively have object-side surfaces 15, 25, 35, 45, 55, 65, 75, and 85 facing the object side A1 and allowing image light to pass through and image-side surfaces 16, 26, 36, 46 56, 66, 76, and 86 facing the image side A2 and allowing the image light to pass through. In the embodiment, the aperture 0 is disposed on the object side A1 of the first lens 1.

The first lens 1 has positive refracting power. The optical axis area of the object-side surface 15 is a convex surface. The optical axis area of the image-side surface 16 is a concave surface. Both the object-side surface 15 and the image-side surface 16 are aspheric surfaces. The second lens 2 has negative refracting power. The optical axis area of the object-side surface 25 is a convex surface. The optical axis area of the image-side surface 26 is a concave surface. Both the object-side surface 25 and the image-side surface 26 are aspheric surfaces. The third lens 3 has negative refracting power. The optical axis area of the object-side surface 35 is a convex surface. The optical axis area of the image-side surface 36 is a concave surface. Both the object-side surface 35 and the image-side surface 36 are aspheric surfaces. The fourth lens 4 has positive refracting power. The optical axis area of the object-side surface 45 is a concave surface. The optical axis area of the image-side surface 46 is a convex surface. Both the object-side surface 45 and the image-side surface 46 are aspheric surfaces. The fifth lens 5 has negative refracting power. The optical axis area of the object-side surface 55 is a convex surface. The optical axis area of the image-side surface 56 is a concave surface. Both the object-side surface 55 and the image-side surface 56 are aspheric surfaces. The sixth lens 6 has positive refracting power. The optical axis area of the object-side surface 65 is a convex surface. The optical axis area of the image-side surface 66 is a concave surface. Both the object-side surface 65 and the image-side surface 66 are aspheric surfaces. The seventh lens 7 has negative refracting power. The optical axis area of the object-side surface 75 is a concave surface. The optical axis area of the image-side surface 76 is a concave surface. Both the object-side surface 75 and the image-side side surface 76 are aspheric surfaces.

It should be noted that FIG. 1A is a schematic diagram of the imaging lens 10 of a first embodiment in a use state, and FIG. 1B is a schematic diagram of the imaging lens 10 of a first embodiment in a non-use state. Specifically, the first lens 1 to the seventh lens 7 of the imaging lens 10 can be divided into a first group close to the object side A1 and having positive refracting power, and a second group close to the image side A2 and having negative refracting power. The first group includes the first lens 1 to the third lens 3, the second group includes the fourth lens 4 to the seventh lens 7, and the diameter of the third lens 3 closest to the image side A2 in the first group is less than the diameter of the fourth lens 4 closest to the object side A1 in the second group. Therefore, the first group can move relative to the second group on the optical axis I, so that the total length of the lens of the imaging lens 10 in the non-use state shown in FIG. 1B can be shorter than the total length of the lens in the use state shown in FIG. 1A to achieve the purpose of shortening the lens in the non-use state. In the embodiment, the total length of the lens of the imaging lens 10 in the non-use state can be shortened by at least 0.85 mm compared with the total length of the lens in the use state. When the distance between the first group and the second group is the minimum value, the vertical projections of the third lens 3 and the fourth lens 4 on the optical axis I overlap, as shown in FIG. 1B.

Other detailed optical data of the imaging lens 10 of the first embodiment in the use state of FIG. 1A are shown in Table 1.

TABLE 1

| Element | Surface | Radius of curvature (mm) | Distance (mm) | Refractive index | Abbe number |
|---|---|---|---|---|---|
| object | | | infinite | | |
| aperture 0 | | infinite | −0.500 | | |
| first lens 1 | object-side surface 15 | 3.442 | 1.194 | 1.54 | 59.50 |
| | image-side surface 16 | 23.413 | 0.253 | | |
| second lens 2 | object-side surface 25 | 36.705 | 0.352 | 1.66 | 18.40 |
| | image-side surface 26 | 8.827 | 0.677 | | |
| third lens 3 | object-side surface 35 | 25.069 | 0.521 | 1.69 | 18.40 |
| | image-side surface 36 | 29.422 | 0.935 | | |
| fourth lens 4 | object-side surface 45 | −19.408 | 1.150 | 1.54 | 59.50 |
| | image-side surface 46 | −9.022 | 0.113 | | |
| fifth lens 5 | object-side surface 55 | 8.404 | 0.422 | 1.57 | 37.40 |
| | image-side surface 56 | 6.913 | 0.655 | | |
| sixth lens 6 | object-side surface 65 | 4.570 | 0.865 | 1.54 | 59.50 |
| | image-side surface 66 | 7.974 | 1.368 | | |
| seventh lens 7 | object-side surface 75 | −13.815 | 0.680 | 1.54 | 59.50 |
| | image-side surface 76 | 5.696 | 0.646 | | |
| filter 8 | object-side surface 85 | infinite | 0.110 | 1.52 | 64.17 |
| | image-side surface 86 | infinite | 0.324 | | |
| | image plane 99 | infinite | | | |

In Table 1, the distance marked as the object-side surface 15 (1.194 mm as shown in Table 1) refers to the thickness of the first lens 1 on the optical axis I, and the distance marked as the image-side surface 16 (shown as 0.253 mm in Table 1) refers to the distance between the image-side surface 16 of the first lens 1 and the object-side surface 25 of the second lens 2 on the optical axis I, that is, the gap between the first lens 1 and the second lens 2 on the optical axis I, and so on and so forth.

In the embodiment, the object-side surfaces 15, 25, 35, 45, 55, 65, and 75 of the first lens 1, the second lens 2, the third lens 3, the fourth lens 4, the fifth lens 5, the sixth lens 6, and the seventh lens 7 and the image-side surfaces 16, 26, 36, 46, 56, 66, and 76 are all aspheric surfaces, and the aspheric surfaces are defined according to the following formula (1):

$$Z(Y) = \frac{Y^2}{R} \Bigg/ \left(1 + \sqrt{1-(1+K)\frac{Y^2}{R^2}}\right) + \sum_{i=1}^{n} a_{2i} \times Y^{2i} \tag{1}$$

Y: the distance between the point on the aspheric curve and the optical axis;

Z: the aspheric depth, that is, the vertical distance between a point on the aspheric surface that is Y from the optical axis and a tangent plane tangent to the vertex on the optical axis of the aspheric surface;

R: the radius of curvature of the lens surface;

K: the cone coefficient;

$a_{2i}$: the 2ith order aspheric coefficient.

The cone coefficient K and various aspheric coefficients in formula (1) of the above-mentioned aspheric surface in the embodiment are as shown in Table 2. The number 15 in Table 2 represents the object-side surface 15 of the first lens 1, the number 16 represents the image-side surface 16 of the first lens 1, and so on and so forth for other numbers.

Figure 1E:
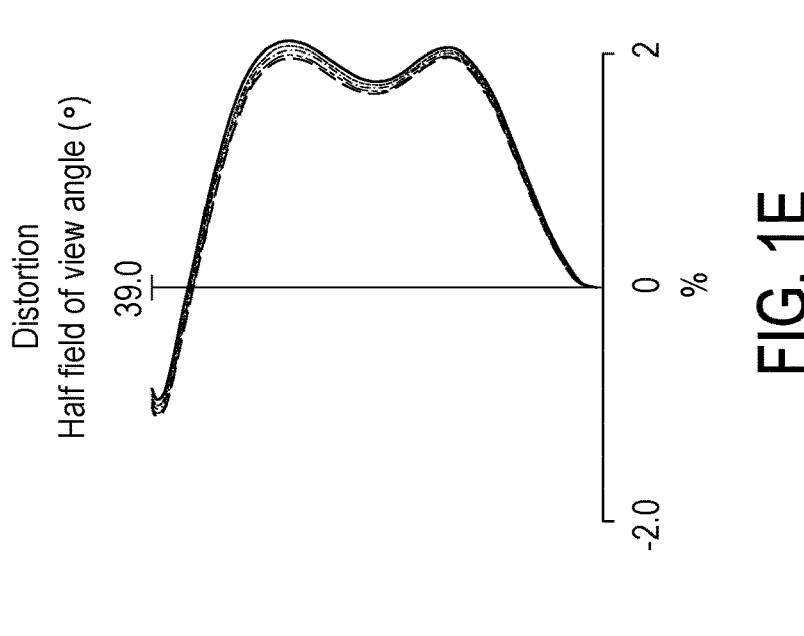
FIG. 1E is a schematic diagram of a distortion of the imaging lens of the first embodiment.
Figure 1D:
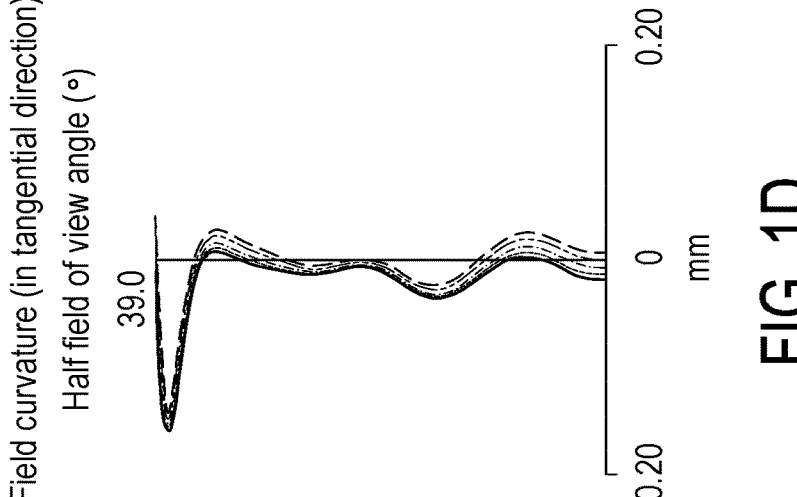
FIG. 1C and FIG. 1D are schematic diagrams of a field curvature of the imaging lens of the first embodiment.

Referring again to FIG. 1C to FIG. 1E, FIG. 1C shows a field curvature aberration graph in the sagittal direction when light with wavelengths of 470 nm, 510 nm, 555 nm, 610 nm, and 650 nm is respectively incident on the imaging lens 10 of the first embodiment. FIG. 1D shows a field curvature aberration graph in the tangential direction when light with wavelengths of 470 nm, 510 nm, 555 nm, 610 nm, and 650 nm is respectively incident on the imaging lens 10 of the first embodiment. FIG. 1E shows a distortion graph of imaging lens 10 when light with wavelengths of 470 nm, 510 nm, 555 nm, 610 nm, and 650 nm is respectively incident on the imaging lens 10 of the first embodiment.

Figure 1C:
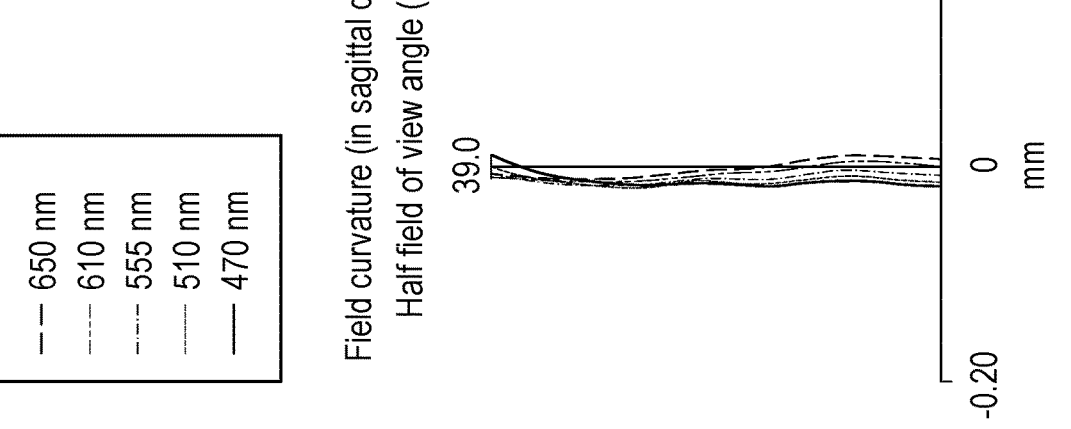

In the two field curvature aberration graphs shown in FIG. 1C and FIG. 1D, the field curvature aberrations of the five representative wavelengths in the entire field of view fall within ±0.20 mm, which illustrates that the imaging lens 10 of the first embodiment of the invention can effectively eliminate aberrations. In the distortion graph shown in FIG. 1E, the distortion aberrations of the five representative wavelengths in the entire field of view fall within the range of ±2%, which illustrates that the imaging lens 10 of the first embodiment of the invention has favorable imaging quality.

Figure 2A:
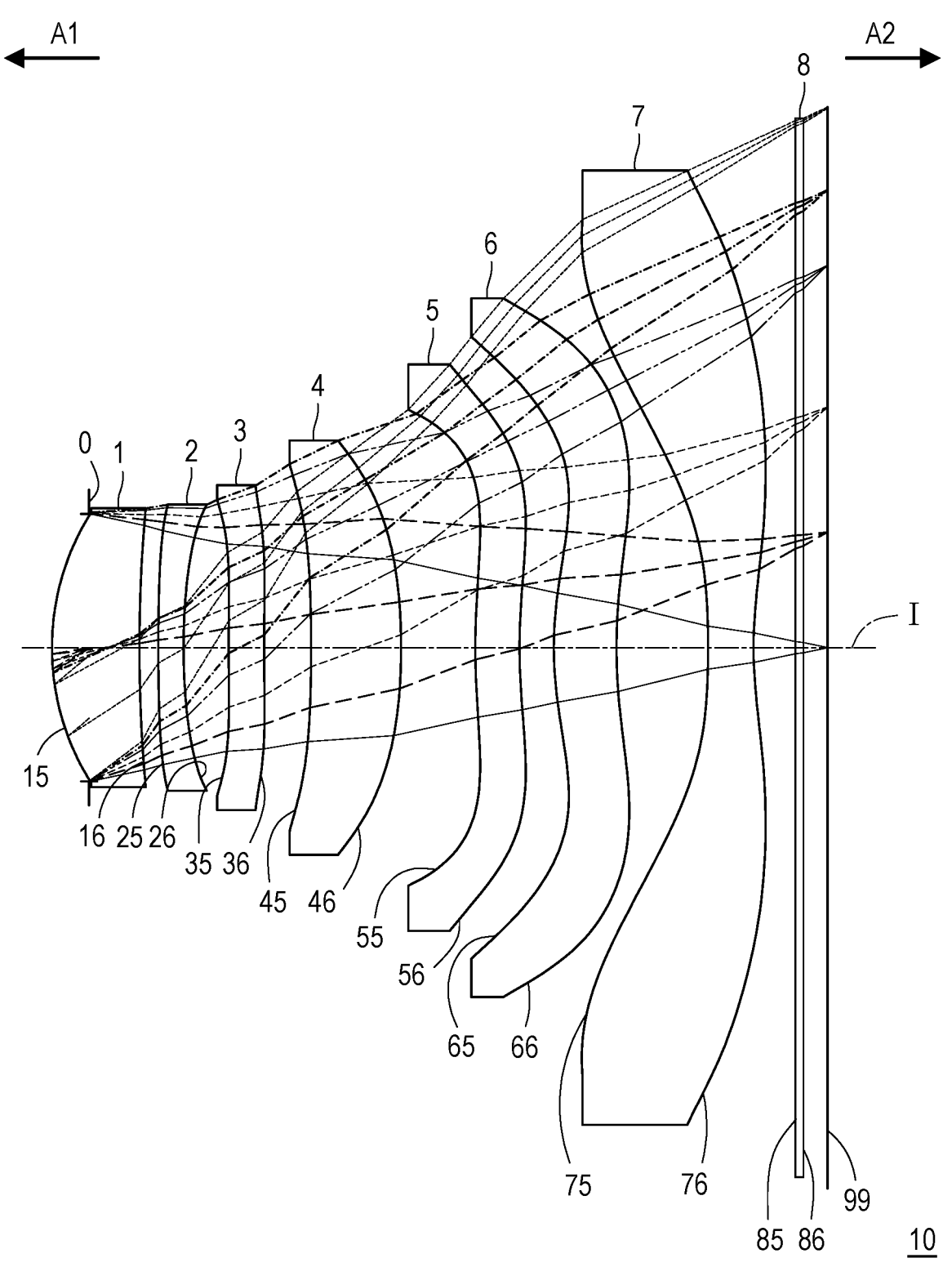
FIG. 2A and FIG. 2B are schematic diagrams of an imaging lens according to a second embodiment of the invention.
Figure 2B:
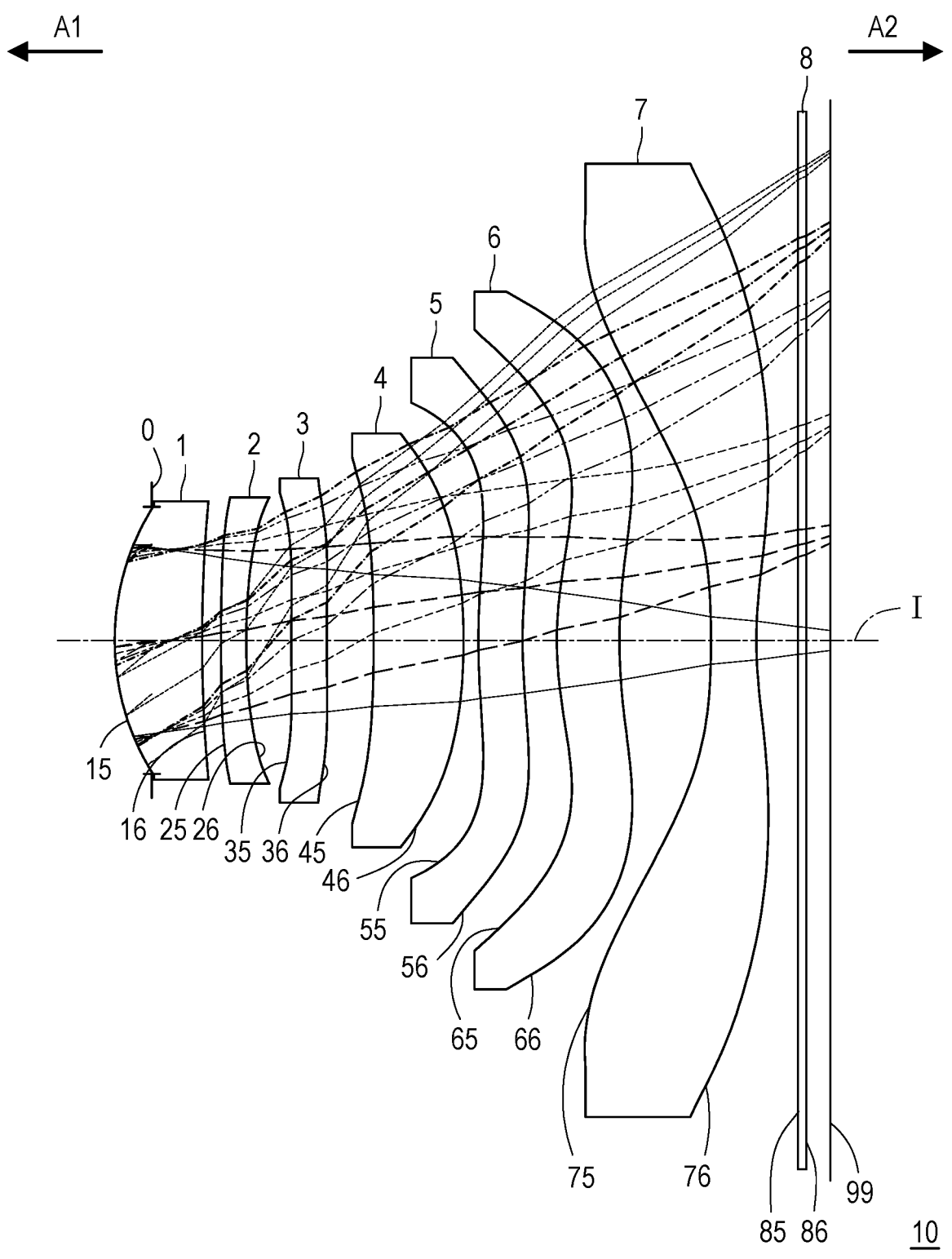

Referring to FIG. 2A and FIG. 2B, a schematic diagram of an imaging lens according to a second embodiment of the invention is shown. The imaging lens 10 sequentially includes the aperture 0, the first lens 1, the second lens 2, the third lens 3, the fourth lens 4, the fifth lens, the sixth lens 6, the seventh lens 7, and the filter 8 along the optical axis I of the imaging lens 10 from the object side A1 to the image side A2. When the light emitted by an object to be photographed enters the imaging lens 10 and sequentially passes through the aperture 0, the first lens 1, the second lens 2, the third lens 3, the fourth lens 4, the fifth lens 5, and the six lens 6, the seventh lens 7, and the filter 8, an image will be formed on the image plane 99. Half of the diagonal length of the effective pixel area on the image plane 99 is 8 mm (ImgH is

TABLE 2

| Surface | K | $a_4$ | $a_6$ | $a_8$ | $a_{10}$ |
|---|---|---|---|---|---|
| 15 | 0.00E+00 | 1.01E−01 | 2.08E−03 | −2.34E−03 | −1.00E−03 |
| 16 | 0.00E+00 | 2.95E−03 | −9.31E−03 | 6.44E−03 | −1.35E−03 |
| 25 | 0.00E+00 | 1.19E−01 | 1.30E−02 | 9.82E−04 | 1.06E−03 |
| 26 | 0.00E+00 | 6.86E−02 | 1.89E−02 | 4.49E−03 | 1.72E−03 |
| 35 | 0.00E+00 | −2.31E−01 | 6.42E−03 | 3.53E−03 | 1.19E−03 |
| 36 | 0.00E+00 | −2.55E−01 | 2.44E−02 | 7.31E−03 | 1.28E−03 |
| 45 | 0.00E+00 | −2.52E−01 | 3.02E−02 | 1.15E−02 | 2.14E−03 |
| 46 | 0.00E+00 | −5.27E−01 | 2.30E−02 | 5.92E−03 | 4.10E−03 |
| 55 | 0.00E+00 | −1.44E+00 | −1.63E−01 | −5.25E−02 | −2.26E−02 |
| 56 | 0.00E+00 | −1.57E+00 | 1.34E−01 | 4.07E−02 | −5.59E−03 |
| 65 | 0.00E+00 | −2.47E+00 | 1.68E−01 | 1.48E−02 | −9.90E−03 |
| 66 | 0.00E+00 | −2.66E+00 | −4.97E−02 | −3.70E−03 | −1.07E−02 |
| 75 | 0.00E+00 | −7.02E−01 | 9.59E−01 | −3.89E−01 | 1.45E−01 |
| 76 | 0.00E+00 | −6.52E+00 | 1.13E+00 | −3.88E−01 | 1.65E−01 |

| Surface | $a_{12}$ | $a_{14}$ | $a_{16}$ | $a_{18}$ | $a_{20}$ |
|---|---|---|---|---|---|
| 15 | −1.14E−04 | −2.40E−05 | 0.00E+00 | 0.00E+00 | 0.00E+00 |
| 16 | −4.51E−03 | −1.40E−03 | 0.00E+00 | 0.00E+00 | 0.00E+00 |
| 25 | 1.32E−05 | 1.66E−04 | 0.00E+00 | 0.00E+00 | 0.00E+00 |
| 26 | 1.16E−04 | 4.72E−05 | 0.00E+00 | 0.00E+00 | 0.00E+00 |
| 35 | 1.82E−04 | 4.37E−05 | 0.00E+00 | 0.00E+00 | 0.00E+00 |
| 36 | 3.76E−06 | −4.89E−05 | 0.00E+00 | 0.00E+00 | 0.00E+00 |
| 45 | −5.21E−04 | 2.21E−04 | 2.97E−04 | 1.42E−04 | 0.00E+00 |
| 46 | 1.02E−03 | −1.27E−04 | 2.30E−04 | 1.28E−04 | 0.00E+00 |
| 55 | −8.89E−03 | −3.98E−03 | −1.43E−03 | −3.98E−04 | −1.29E−04 |
| 56 | −3.58E−03 | 7.50E−04 | 7.38E−04 | 8.76E−04 | −1.14E−04 |
| 65 | 1.05E−03 | 1.59E−03 | −1.03E−04 | −5.15E−06 | −9.75E−07 |
| 66 | 2.51E−02 | −4.91E−04 | 2.05E−03 | −1.05E−03 | −3.92E−04 |
| 75 | −5.00E−02 | 2.62E−02 | −1.45E−02 | −2.43E−03 | 1.98E−03 |
| 76 | −4.90E−02 | 5.14E−02 | 4.13E−03 | 3.22E−03 | −1.58E−03 |

8 mm). The filter 8 is, for example, an infrared cut-off filter. The filter 8 is disposed between the seventh lens 7 and the image plane 99.

In the embodiment, the first lens 1, the second lens 2, the third lens 3, the fourth lens 4, the fifth lens 5, the sixth lens 6, the seventh lens 7, and the filter 8 of the optical imaging lens 10 respectively have the object-side surfaces 15, 25, 35, 45, 55, 65, 75, and 85 facing the object side A1 and allowing the image light to pass through and the image-side surfaces 16, 26, 36, 46, 56, 66, 76, and 86 facing the image side A2 and allowing the image light to pass through. In the embodiment, the aperture 0 is disposed on the object side A1 of the first lens 1.

The first lens 1 has positive refracting power. The optical axis area of the object-side surface 15 is a convex surface. The optical axis area of the image-side surface 16 is a concave surface. Both the object-side surface 15 and the image-side surface 16 are aspheric surfaces. The second lens 2 has negative refracting power. The optical axis area of the object-side surface 25 is a convex surface. The optical axis area of the image-side surface 26 is a concave surface. Both the object-side surface 25 and the image-side surface 26 are aspheric surfaces. The third lens 3 has negative refracting power. The optical axis area of the object-side surface 35 is a convex surface. The optical axis area of the image-side surface 36 is a concave surface. Both the object-side surface 35 and the image-side surface 36 are aspheric surfaces. The fourth lens 4 has positive refracting power. The optical axis area of the object-side surface 45 is a concave surface. The optical axis area of the image-side surface 46 is a convex surface. Both the object-side surface 45 and the image-side axis area of the image-side surface 76 is a concave surface. Both the object-side surface 75 and the image-side surface 76 are aspheric surfaces.

It should be particularly noted that FIG. 2A is a schematic diagram of the imaging lens 10 of the second embodiment in a use state, and FIG. 2B is a schematic diagram of the imaging lens 10 of the second embodiment in a non-use state. Specifically, the first lens 1 to the seventh lens 7 of the imaging lens 10 can be divided into a first group close to the object side A1 and having positive refracting power, and a second group close to the image side A2 and having negative refracting power. The first group includes the first lens 1 to the fourth lens 4, the second group includes the fifth lens 5 to the seventh lens 7, and the diameter of the fourth lens 4 closest to the image side A2 in the first group is less than the diameter of the fifth lens 5 closest to the object side A1 in the second group. Therefore, the first group can move relative to the second group on the optical axis I, so that the total length of the lens of the imaging lens 10 in the non-use state shown in FIG. 2B can be shorter than the total length of the lens in the use state shown in FIG. 2A to achieve the purpose of shortening the lens in the non-use state. In the embodiment, the total length of the lens of the imaging lens 10 in the non-use state can be shortened by at least 0.90 mm compared with the total length of the lens in the use state. When the distance between the first group and the second group is the minimum value, the vertical projections of the fourth lens 4 and the fifth lens 5 on the optical axis I overlap, as shown in FIG. 2B.

Other detailed optical data of the imaging lens 10 of the second embodiment in the use state of FIG. 2A are shown in Table 3.

TABLE 3

| Element | Surface | Radius of curvature (mm) | Distance (mm) | Refractive index | Abbe number |
|---|---|---|---|---|---|
| object | | | infinite | | |
| aperture 0 | | infinite | −0.500 | | |
| first lens 1 | object-side surface 15 | 3.141 | 1.295 | 1.54 | 59.50 |
| | image-side surface 16 | 12.309 | 0.127 | | |
| second lens 2 | object-side surface 25 | 25.882 | 0.391 | 1.66 | 18.40 |
| | image-side surface 26 | 8.736 | 0.657 | | |
| third lens 3 | object-side surface 35 | 25.036 | 0.466 | 1.69 | 18.40 |
| | image-side surface 36 | 18.412 | 0.428 | | |
| fourth lens 4 | object-side surface 45 | 0.000 | 0.762 | 1.54 | 59.50 |
| | image-side surface 46 | −20.325 | 1.0 | | |
| fifth lens 5 | object-side surface 55 | 7.806 | 0.675 | 1.57 | 37.40 |
| | image-side surface56 | 7.744 | 0.536 | | |
| sixth lens 6 | object-side surface 65 | 4.837 | 0.628 | 1.54 | 59.50 |
| | image-side surface 66 | 6.965 | 1.114 | | |
| seventh lens 7 | object-side surface 75 | −12.262 | 0.751 | 1.54 | 59.50 |
| | image-side surface 76 | 6.272 | 0.735 | | |
| filter 8 | object-side surface 85 | infinite | 0.110 | 1.52 | 64.17 |
| | image-side surface 86 | infinite | 0.324 | | |
| | image plane 99 | infinite | | | | surface 46 are aspheric surfaces. The fifth lens 5 has negative refracting power. The optical axis area of the object-side surface 55 is a convex surface. The optical axis area of the image-side surface 56 is a concave surface. Both the object-side surface 55 and the image-side surface 56 are aspheric surfaces. The sixth lens 6 has positive refracting power. The optical axis area of the object-side surface 65 is a convex surface. The optical axis area of the image-side surface 66 is a concave surface. Both the object-side surface 65 and the image-side surface 66 are aspheric surfaces. The seventh lens 7 has negative refracting power. The optical axis area of the object-side surface 75 is a concave surface. The optical In Table 3, the distance marked as the object-side surface 15 (1.295 mm as shown in Table 3) refers to the thickness of the first lens 1 on the optical axis I, and the distance marked as the image-side surface 16 (shown as 0.127 mm in Table 3) refers to the distance between the image-side surface 16 of the first lens 1 and the object-side surface 25 of the second lens 2 on the optical axis I, that is, the gap between the first lens 1 and the second lens 2 on the optical axis I, and so on and so forth.

In the embodiment, the object-side surfaces 15, 25, 35, 45, 55, 65, and 75 of the first lens 1, the second lens 2, the third lens 3, the fourth lens 4, the fifth lens 5, the sixth lens 6, and the seventh lens 7 and the image-side surfaces 16, 26, 36, 46, 56, 66, and 76 are all aspheric surfaces, and the aspheric surfaces are defined according to formula (1).

The cone coefficient K and various aspheric coefficients in formula (1) of the above-mentioned aspheric surface in the embodiment are as shown in Table 4. The number 15 in Table 4 represents the object-side surface 15 of the first lens 1, the number 16 represents the image-side surface 16 of the first lens 1, and so on and so forth for other numbers.

includes the aperture 0, the first lens 1, the second lens 2, the third lens 3, the fourth lens 4, the fifth lens 5, the sixth lens 6, the seventh lens 7, and the filter 8 along the optical axis I of the imaging lens 10 from the object side A1 to the image side A2. When the light emitted by an object to be photographed enters the imaging lens 10 and sequentially passes through the aperture 0, the first lens 1, the second lens 2, the third lens 3, the fourth lens 4, the fifth lens 5, and the six lenses 6, the seventh lens 7, and the filter 8, an image will

TABLE 4

| Surface | K | $a_4$ | $a_6$ | $a_8$ | $a_{10}$ |
|---|---|---|---|---|---|
| 15 | 0.00E+00 | 8.67E−02 | 3.33E−03 | −2.01E−03 | −1.16E−03 |
| 16 | 0.00E+00 | −9.14E−03 | 4.85E−03 | −2.54E−03 | 1.86E−04 |
| 25 | 0.00E+00 | 9.78E−02 | 1.68E−02 | −1.51E−03 | 1.44E−04 |
| 26 | 0.00E+00 | 7.71E−02 | 1.19E−02 | 1.82E−03 | 7.80E−04 |
| 35 | 0.00E+00 | −1.94E−01 | −8.08E−05 | 2.76E−03 | 1.30E−03 |
| 36 | 0.00E+00 | −2.35E−01 | 1.68E−02 | 7.12E−03 | 1.66E−03 |
| 45 | 0.00E+00 | −2.13E−01 | 3.45E−02 | 1.04E−02 | −1.17E−03 |
| 46 | 0.00E+00 | −3.73E−01 | 4.32E−02 | 7.57E−03 | 1.66E−03 |
| 55 | 0.00E+00 | −1.25E+00 | −9.65E−02 | 5.15E−03 | 6.37E−03 |
| 56 | 0.00E+00 | −1.45E+00 | 1.14E−01 | 3.58E−02 | −3.52E−03 |
| 65 | 0.00E+00 | −2.30E+00 | 1.66E−01 | 1.13E−02 | −8.85E−03 |
| 66 | 0.00E+00 | −2.02E+00 | 7.52E−02 | 3.18E−02 | −6.78E−04 |
| 75 | 0.00E+00 | −9.26E−01 | 8.97E−01 | −3.34E−01 | 1.19E−01 |
| 76 | 0.00E+00 | −5.70E+00 | 1.13E+00 | −3.24E−01 | 1.41E−01 |

| Surface | $a_{12}$ | $a_{14}$ | $a_{16}$ | $a_{18}$ | $a_{20}$ |
|---|---|---|---|---|---|
| 15 | −5.22E−04 | −1.99E−04 | 0.00E+00 | 0.00E+00 | 0.00E+00 |
| 16 | 5.63E−04 | 1.92E−04 | 0.00E+00 | 0.00E+00 | 0.00E+00 |
| 25 | 2.50E−04 | 1.29E−04 | 0.00E+00 | 0.00E+00 | 0.00E+00 |
| 26 | 1.12E−04 | 3.10E−05 | 0.00E+00 | 0.00E+00 | 0.00E+00 |
| 35 | 2.47E−04 | 6.51E−05 | 0.00E+00 | 0.00E+00 | 0.00E+00 |
| 36 | 3.56E−05 | −1.92E−05 | 0.00E+00 | 0.00E+00 | 0.00E+00 |
| 45 | −8.53E−04 | −1.78E−04 | 3.87E−04 | −1.19E−04 | 0.00E+00 |
| 46 | −7.67E−04 | −3.79E−04 | 9.86E−05 | 7.38E−05 | 0.00E+00 |
| 55 | 4.62E−03 | 4.13E−04 | 4.24E−04 | −5.57E−04 | 2.59E−04 |
| 56 | −5.15E−03 | −1.06E−04 | 8.13E−06 | 3.08E−04 | −3.93E−05 |
| 65 | 9.76E−04 | 1.25E−03 | −1.28E−04 | −7.21E−05 | 1.00E−05 |
| 66 | 1.75E−02 | −5.66E−03 | 1.20E−03 | −1.21E−03 | 8.49E−04 |
| 75 | −5.14E−02 | 2.25E−02 | −6.99E−03 | 1.25E−03 | −9.82E−05 |
| 76 | −5.31E−02 | 2.84E−02 | −1.60E−02 | 4.24E−03 | −4.07E−04 |

Figures 2C, 2D, 2E:
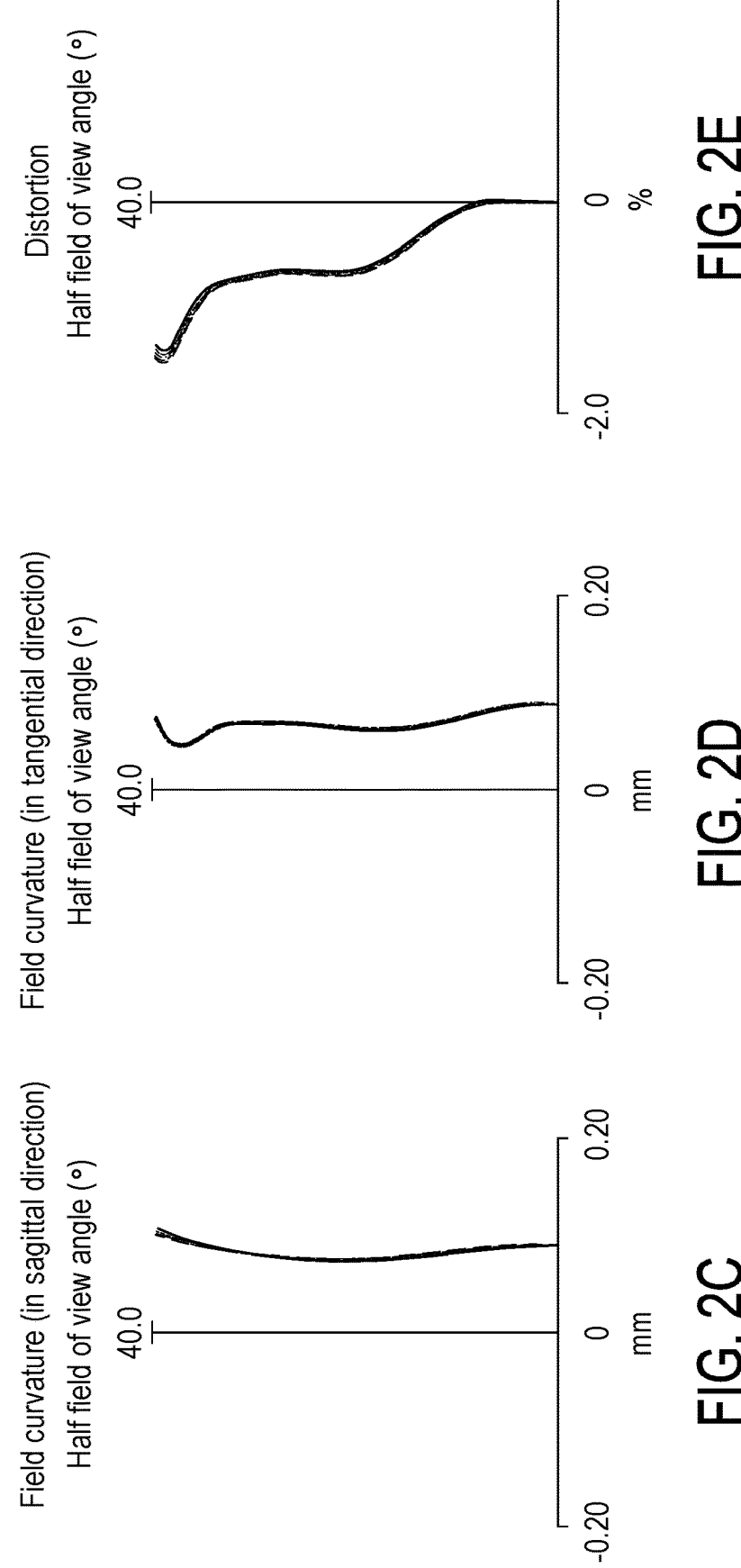
FIG. 2C and FIG. 2D are schematic diagrams of a field curvature of the imaging lens of the second embodiment.
FIG. 2E is a schematic diagram of a distortion of the imaging lens of the second embodiment.

Referring again to FIG. 2C to FIG. 2E, FIG. 2C shows a field curvature aberration graph in the sagittal direction when light with wavelengths of 470 nm, 510 nm, 555 nm, 610 nm, and 650 nm is respectively incident on the imaging lens 10 of the second embodiment. FIG. 2D shows a field curvature aberration graph in the tangential direction when light with wavelengths of 470 nm, 510 nm, 555 nm, 610 nm, and 650 nm is respectively incident on the imaging lens 10 of the second embodiment. FIG. 2E shows a distortion graph when light with wavelengths of 470 nm, 510 nm, 555 nm, 610 nm, and 650 nm is respectively incident on the imaging lens 10 of the second embodiment.

In the two field curvature aberration graphs shown in FIG. 2C and FIG. 2D, the field curvature aberrations of the five representative wavelengths in the entire field of view fall within ±0.12 mm, which illustrates that the imaging lens 10 of the second embodiment of the invention can effectively eliminate aberrations. In the distortion graph shown in FIG. 2E, the distortion aberrations of the five representative wavelengths in the entire field of view fall within the range of ±2%, which illustrates that the imaging lens 10 of the second embodiment of the invention has favorable Imaging quality.

Figure 3A:
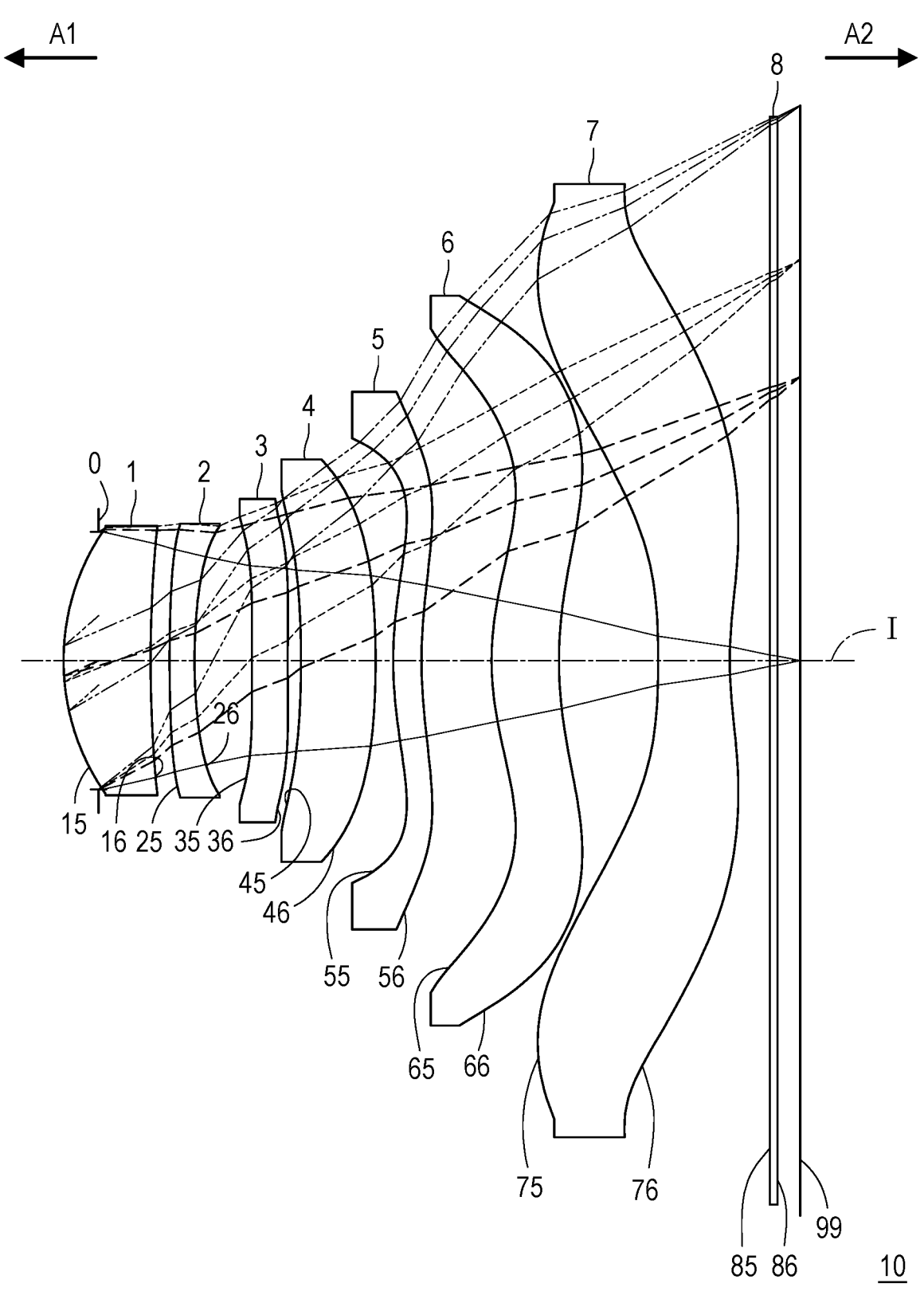
FIG. 3A and FIG. 3B are schematic diagrams of an imaging lens according to a third embodiment of the invention.
Figure 3B:
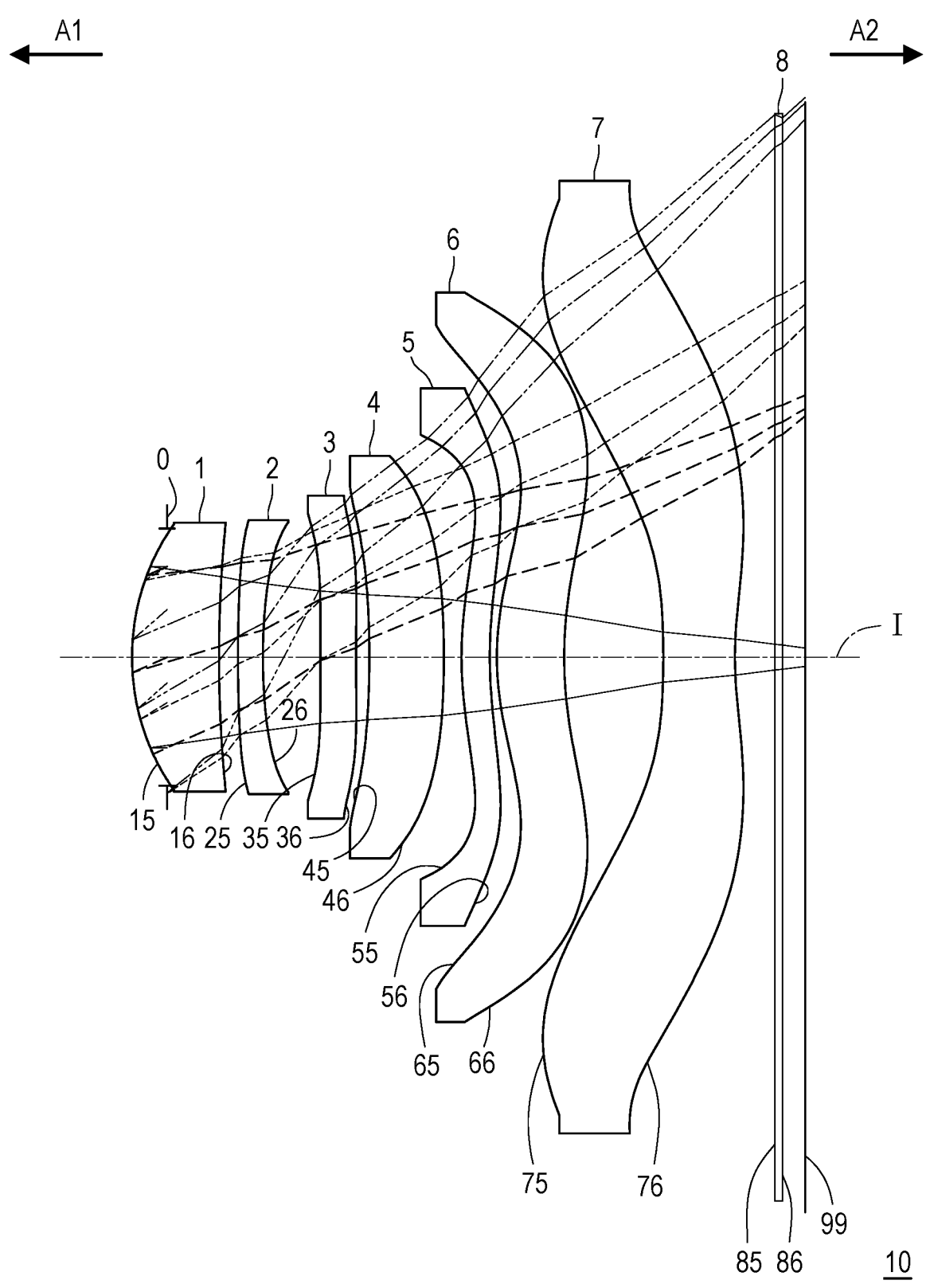

Referring to FIG. 3A and FIG. 3B, a schematic diagram of an imaging lens according to a third embodiment of the invention is shown. The imaging lens 10 sequentially be formed on the image plane 99. Half of the diagonal length of the effective pixel area on the image plane 99 is 8 mm (ImgH is 8 mm). The filter 8 is, for example, an infrared cut-off filter. The filter 8 is disposed between the seventh lens 7 and the image plane 99.

In the embodiment, the first lens 1, the second lens 2, the third lens 3, the fourth lens 4, the fifth lens 5, the sixth lens 6, the seventh lens 7 and the filter 8 of the optical imaging lens 10 respectively have the object-side surfaces 15, 25, 35, 45, 55, 65, 75, and 85 facing the object side A1 and allowing the image light to pass through and the image-side surfaces 16, 26, 36, 46, 56, 66, 76, and 86 facing the image side A2 and allowing the image light to pass through. In the embodiment, the aperture 0 is disposed on the object side A1 of the first lens 1.

The first lens 1 has positive refracting power. The optical axis area of the object-side surface 15 is a convex surface. The optical axis area of the image-side surface 16 is a concave surface. Both the object-side surface 15 and the image-side surface 16 are aspheric surfaces. The second lens 2 has negative refracting power. The optical axis area of the object-side surface 25 is a convex surface. The optical axis area of the image-side surface 26 is a concave surface. Both the object-side surface 25 and the image-side surface 26 are aspheric surfaces. The third lens 3 has negative refracting power. The optical axis area of the object-side surface 35 is a convex surface. The optical axis area of the image-side surface 36 is a concave surface. Both the object-side surface 35 and the image-side surface 36 are aspheric surfaces. The fourth lens 4 has positive refracting power. The optical axis area of the object-side surface 45 is a concave surface. The optical axis area of the image-side surface 46 is a convex surface. Both the object-side surface 45 and the image-side surface 46 are aspheric surfaces. The fifth lens 5 has positive refracting power. The optical axis area of the object-side surface 55 is a convex surface. The optical axis area of the image-side surface 56 is a concave surface. Both the object-side surface 55 and the image-side surface 56 are aspheric surfaces. The sixth lens 6 has positive refracting power. The optical axis area of the object-side surface 65 is a convex surface. The optical axis area of the image-side surface 66 is group on the optical axis I, so that the total length of the lens of the imaging lens 10 in the non-use state shown in FIG. 3B can be shorter than the total length of the lens in the use state shown in FIG. 3A to achieve the purpose of shortening the lens in the non-use state. In the embodiment, the total length of the lens of the imaging lens 10 in the non-use state can be shortened by at least 0.90 mm compared with the total length of the lens in the use state. When the distance between the first group and the second group is the minimum value, the vertical projections of the fifth lens 5 and the sixth lens 6 on the optical axis I overlap, as shown in FIG. 3B.

Other detailed optical data of the imaging lens 10 of the third embodiment in the use state of FIG. 3A are shown in Table 5.

TABLE 5

| Element | Surface | Radius of curvature (mm) | Distance (mm) | Refractive index | Abbe number |
|---|---|---|---|---|---|
| object | | | infinite | | |
| aperture 0 | | infinite | −0.500 | | |
| first lens 1 | object-side surface 15 | 3.346 | 1.242 | 1.54 | 59.50 |
| | image-side surface 16 | 18.628 | 0.271 | | |
| second lens 2 | object-side surface 25 | 24.058 | 0.356 | 1.66 | 18.40 |
| | image-side surface 26 | 8.407 | 0.819 | | |
| third lens 3 | object-side surface 35 | 81.947 | 0.511 | 1.69 | 18.40 |
| | image-side surface 36 | 40.899 | 0.189 | | |
| fourth lens 4 | object-side surface 45 | −14.439 | 1.064 | 1.54 | 59.50 |
| | image-side surface 46 | −12.949 | 0.252 | | |
| fifth lens 5 | object-side surface 55 | 5.772 | 0.404 | 1.57 | 37.40 |
| | image-side surface 56 | 6.598 | 1.0 | | |
| sixth lens 6 | object-side surface 65 | 4.105 | 0.961 | 1.54 | 59.50 |
| | image-side surface 66 | 5.896 | 1.415 | | |
| seventh lens 7 | object-side surface 75 | −13.657 | 1.022 | 1.54 | 59.50 |
| | image-side surface 76 | 5.597 | 0.569 | | |
| filter 8 | object-side surface 85 | infinite | 0.110 | 1.52 | 64.17 |
| | image-side surface 86 | infinite | 0.324 | | |
| | image plane 99 | infinite | | | | a concave surface. Both the object-side surface 65 and the image-side surface 66 are aspheric surfaces. The seventh lens 7 has negative refracting power. The optical axis area of the object-side surface 75 is a concave surface. The optical axis area of the image-side surface 76 is a concave surface. Both the object-side surface 75 and the image-side surface 76 are aspheric surfaces.

It should be noted that FIG. 3A is a schematic diagram of the imaging lens 10 of the third embodiment in a use state, and FIG. 3B is a schematic diagram of the imaging lens 10 of the third embodiment in a non-use state. Specifically, the first lens 1 to the seventh lens 7 of the imaging lens 10 can be divided into a first group close to the object side A1 and having positive refracting power, and a second group close to the image side A2 and having negative refracting power. The first group includes the first lens 1 to the fifth lens 5, the second group includes the sixth lens 6 and the seventh lens 7, and the diameter of the fifth lens 5 closest to the image side A2 in the first group is less than the diameter of the sixth lens 6 closest to the object side A1 in the second group. Therefore, the first group can move relative to the second In Table 5, the distance marked as the object-side surface 15 (1.242 mm as shown in Table 5) refers to the thickness of the first lens 1 on the optical axis I, and the distance marked as the image-side surface 16 (shown as 0.271 mm in Table 5) refers to the distance between the image-side surface 16 of the first lens 1 and the object-side surface 25 of the second lens 2 on the optical axis I, that is, the gap between the first lens 1 and the second lens 2 on the optical axis I, and so on and so forth.

In the embodiment, the object-side surfaces 15, 25, 35, 45, 55, 65, and 75 of the first lens 1, the second lens 2, the third lens 3, the fourth lens 4, the fifth lens 5, the sixth lens 6, and the seventh lens 7 and the image-side surfaces 16, 26, 36, 46, 56, 66, and 76 are all aspheric surfaces, and the aspheric surfaces are defined according to formula (1).

The cone coefficient K and various aspheric coefficients in formula (1) of the above-mentioned aspheric surface in the embodiment are as shown in Table 6. The number 15 in Table 6 represents the object-side surface 15 of the first lens 1, the number 16 represents the image-side surface 16 of the first lens 1, and so on and so forth for other numbers.

TABLE 6

| Surface | K | $a_4$ | $a_6$ | $a_8$ | $a_{10}$ |
|---|---|---|---|---|---|
| 15 | 0.00E+00 | 1.02E−01 | 3.81E−03 | −2.83E−03 | −1.65E−03 |
| 16 | 0.00E+00 | −1.93E−02 | −3.34E−04 | −5.14E−04 | 2.40E−03 |

TABLE 6-continued

| | | | | |
|---|---|---|---|---|
| 25 | 0.00E+00 | 1.03E−01 | 2.01E−02 | −9.34E−04 | 6.01E−04 |
| 26 | 0.00E+00 | 7.78E−02 | 1.77E−02 | 1.33E−03 | 4.19E−04 |
| 35 | 0.00E+00 | −2.14E−01 | 6.43E−03 | 4.21E−03 | 1.07E−03 |
| 36 | 0.00E+00 | −2.69E−01 | 2.11E−02 | 8.19E−03 | 1.43E−03 |
| 45 | 0.00E+00 | −1.94E−01 | 5.29E−02 | 9.45E−03 | −1.37E−03 |
| 46 | 0.00E+00 | −5.33E−01 | −2.10E−02 | −4.74E−04 | 1.71E−03 |
| 55 | 0.00E+00 | −1.43E+00 | −1.92E−01 | −4.39E−02 | −9.29E−03 |
| 56 | 0.00E+00 | −1.45E+00 | 1.59E−01 | 2.49E−02 | −8.13E−03 |
| 65 | 0.00E+00 | −2.48E+00 | 1.78E−01 | 1.21E−02 | −9.88E−03 |
| 66 | 0.00E+00 | −2.40E+00 | −3.46E−02 | 4.88E−03 | −1.94E−02 |
| 75 | 0.00E+00 | −7.04E−01 | 1.00E+00 | −3.62E−01 | 1.30E−01 |
| 76 | 0.00E+00 | −6.74E+00 | 1.39E+00 | −3.71E−01 | 1.55E−01 |

| Surface | $a_{12}$ | $a_{14}$ | $a_{16}$ | $a_{18}$ | $a_{20}$ |
|---|---|---|---|---|---|
| 15 | −6.57E−04 | −1.80E−04 | 0.00E+00 | 0.00E+00 | 0.00E+00 |
| 16 | −4.48E−03 | −1.02E−03 | 0.00E+00 | 0.00E+00 | 0.00E+00 |
| 25 | 1.80E−04 | 9.68E−05 | 0.00E+00 | 0.00E+00 | 0.00E+00 |
| 26 | −3.08E−05 | 3.99E−06 | 0.00E+00 | 0.00E+00 | 0.00E+00 |
| 35 | 1.53E−04 | −1.68E−05 | 0.00E+00 | 0.00E+00 | 0.00E+00 |
| 36 | 3.60E−05 | −1.55E−04 | 0.00E+00 | 0.00E+00 | 0.00E+00 |
| 45 | −2.23E−03 | −6.31E−04 | 1.41E−04 | 6.31E−05 | 0.00E+00 |
| 46 | 2.32E−03 | −3.72E−04 | 4.21E−05 | −2.47E−04 | 0.00E+00 |
| 55 | −5.87E−03 | −2.21E−03 | −2.76E−04 | −3.02E−04 | −6.56E−06 |
| 56 | −9.36E−03 | 4.91E−03 | −1.19E−03 | −1.46E−03 | −1.45E−04 |
| 65 | 9.28E−04 | 1.33E−03 | −1.44E−04 | −7.88E−05 | 1.29E−05 |
| 66 | 1.39E−02 | −4.31E−03 | 1.56E−03 | 5.06E−04 | −1.05E−04 |
| 75 | −5.63E−02 | 2.44E−02 | −7.68E−03 | 1.36E−03 | −9.87E−05 |
| 76 | −5.75E−02 | 3.12E−02 | −1.74E−02 | 4.64E−03 | −4.37E−04 |

Figures 3C, 3D, 3E:
FIG. 3C and FIG. 3D are schematic diagrams of a field curvature of the imaging lens of the third embodiment.
FIG. 3E is a schematic diagram of a distortion of the imaging lens of the third embodiment.

Referring again to FIG. 3C to FIG. 3E. FIG. 3C shows a field curvature aberration graph in the sagittal direction when light with wavelengths of 470 nm, 510 nm, 555 nm, 610 nm, and 650 nm is respectively incident on the imaging lens 10 of the third embodiment. FIG. 3D shows a field curvature aberration graph in the tangential direction when light with wavelengths of 470 nm, 510 nm, 555 nm, 610 nm, and 650 nm is respectively incident on the imaging lens 10 of the third embodiment. FIG. 3E shows a distortion graph when light with wavelengths of 470 nm, 510 nm, 555 nm, 610 nm, and 650 nm is respectively incident on the imaging lens 10 of the third embodiment.

In the two field curvature aberration graphs shown in FIG. 3C and FIG. 3D, the field curvature aberrations of the five representative wavelengths in the entire field of view fall within ±0.3 mm, which illustrates that the imaging lens 10 of the third embodiment of the invention can effectively eliminate aberrations. In the distortion graph shown in FIG. 3E, the distortion aberrations of the five representative wavelengths in the entire field of view fall within the range of ±2%, which illustrates that the imaging lens 10 of the third embodiment of the invention has favorable imaging quality.

The above-mentioned imaging lens 10 of the first embodiment to the imaging lens 10 of the third embodiment satisfy the conditional expression: 0.35×ImgH<TL1<0.65×ImgH, where tL1 is the distance on the optical axis I between the object-side surface 15 of the first lens 1 closest to the object side A1 among the plurality of lenses in the first group of each embodiment and the image side of the lens closest to the image side A2 in the first group, and ImgH is half the diagonal length of the effective pixel area on the image plane 99.

The above-mentioned imaging lens 10 of the first embodiment to the imaging lens 10 of the third embodiment satisfy the conditional expression: 0.40×ImgH<TL2<0.70×ImgH, where TL2 is the distance on the optical axis I between the object-side surface of the lens closest to the object side A1 among the plurality of lenses in the second group of each embodiment and the image-side surface 76 of the seventh lens 7 closest to the image side A2 in the second group, and ImgH is half the diagonal length of the effective pixel area on the image plane 99.

The above-mentioned imaging lens 10 of the first embodiment to the imaging lens 10 of the third embodiment satisfy the conditional expression: ImgH<EFL1<1.40×ImgH, where EFL1 is the effective focal length of the first group in each embodiment, and ImgH is half the diagonal length of the effective pixel area on the image plane 99.

The above-mentioned imaging lens 10 of the first embodiment to the imaging lens 10 of the third embodiment satisfy the conditional expression: 1.40×ImgH<EFL2<3.15×ImgH, where EFL2 is the effective focal length of the second group in each embodiment, and ImgH is half the diagonal length of the effective pixel area on the image plane 99.

To sum up, each lens of the imaging lens provided by the embodiment of the invention can be grouped into a first group close to the object side and a second group close to the image side. The first group can move relative to the second group to shorten the total length of the lens, and each imaging lens has favorable imaging quality.

What is claimed is:

1. An imaging lens, sequentially comprising from an object side to an image side along an optical axis:
  a first lens, having positive refracting power;
  a second lens, having negative refracting power;
  a third lens, having refracting power;
  a fourth lens, having positive refracting power;
  a fifth lens, having refracting power;
  a sixth lens, having positive refracting power; and
  a seventh lens, having negative refracting power,
  wherein there are a total of seven lenses having refracting power in the imaging lens,
  when the first to seventh lenses are grouped into a first group close to the object side and a second group close to the image side, a plurality of lenses totaling three to five lenses have refracting power in the first group, a plurality of lenses totaling two to four lenses have refracting power in the second group, and the first group is configured to move relative to the second group on the optical axis, wherein an effective focal length EFL2 of the second group satisfies a conditional expression: $1.40\times$ ImgH$<$EFL2$<3.15\times$ImgH, where ImgH is half a diagonal length of an effective pixel area on an image plane.

2. The imaging lens according to claim 1, wherein a distance in which the first group moves relative to the second group on the optical axis falls within a range of less than or equal to 0.90 mm.

3. The imaging lens according to claim 2, wherein when a distance between the first group and the second group is a minimum value, vertical projections of the lens closest to the image side in the first group and the lens closest to the object side in the second group on the optical axis overlap.

4. The imaging lens according to claim 1, wherein a diameter of the lens closest to the image side in the first group is less than a diameter of the lens closest to the object side in the second group.

5. The imaging lens according to claim 1, wherein the first group has positive refracting power, and the second group has negative refracting power.

6. The imaging lens according to claim 1, wherein a distance TL1 on the optical axis between an object-side surface of the lens closest to the object side and an image-side surface of the lens closest to the image side among the plurality of lenses of the first group satisfies a conditional expression: $0.35\times$ImgH$<$TL1$<0.65\times$ImgH.

7. The imaging lens according to claim 1, wherein a distance TL2 on the optical axis between an object-side surface of the lens closest to the object side and an image-side surface of the lens closest to the image side among the plurality of lenses of the second group satisfies a conditional expression: $0.40\times$ImgH$<$TL2$<0.70\times$ImgH.

8. The imaging lens according to claim 1, further comprising an aperture disposed on an object side of the first lens.

9. The imaging lens according to claim 1, wherein an effective focal length EFL1 of the first group satisfies a conditional expression: ImgH$<$EFL1$<1.40\times$ImgH.

* * * * *